(12) United States Patent
Lyons et al.

(10) Patent No.: US 8,205,118 B2
(45) Date of Patent: Jun. 19, 2012

(54) SOFTWARE COMPONENT SELF-SCRUBBING

(75) Inventors: Michael E. Lyons, Austin, TX (US); Bruce Mealey, Austin, TX (US); Basu Vaidyanathan, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 245 days.

(21) Appl. No.: 12/508,098

(22) Filed: Jul. 23, 2009

(65) Prior Publication Data

US 2011/0022895 A1    Jan. 27, 2011

(51) Int. Cl.
    G06F 11/30    (2006.01)
(52) U.S. Cl. .......................... 714/38.1; 714/37; 707/690
(58) Field of Classification Search ................ 714/38.1
    See application file for complete search history.

(56) References Cited

U.S. PATENT DOCUMENTS

| | | | |
|---|---|---|---|
| 7,072,918 B2 | 7/2006 | Garthwaite | |
| 7,139,784 B2 | 11/2006 | Knobe et al. | |
| 7,146,390 B2 | 12/2006 | Garthwaite | |
| 7,730,452 B1* | 6/2010 | Li et al. | 717/124 |
| 2002/0087949 A1* | 7/2002 | Golender et al. | 717/124 |
| 2003/0023856 A1* | 1/2003 | Horne et al. | 713/187 |
| 2003/0060951 A1* | 3/2003 | Mayer et al. | 701/29 |
| 2004/0199813 A1* | 10/2004 | Hillman et al. | 714/13 |
| 2004/0260797 A1* | 12/2004 | De Loye | 709/223 |
| 2005/0028150 A1* | 2/2005 | Halpern | 717/162 |
| 2006/0005078 A1* | 1/2006 | Guo et al. | 714/38 |
| 2006/0107256 A1* | 5/2006 | Zarenin et al. | 717/127 |
| 2007/0006041 A1* | 1/2007 | Brunswig et al. | 714/38 |
| 2008/0115112 A1* | 5/2008 | Sharma | 717/126 |
| 2008/0155339 A1* | 6/2008 | Lowe et al. | 714/38 |
| 2008/0244534 A1* | 10/2008 | Golender et al. | 717/128 |
| 2009/0106603 A1* | 4/2009 | Dilman et al. | 714/42 |
| 2010/0017620 A1* | 1/2010 | Horne et al. | 713/187 |

OTHER PUBLICATIONS

Cormany, Adam T.; "Speaking UNIX: It's all about the inode"; Jun. 10, 2008, copyright 1994 and 2007 by IBM Corporation.

Lascu, Octavian, et al.; "IBM AIX Continuous Availablity Features"; IBM Corporation, retrieved from http://www.ibm.com/redbooks Apr. 2008.

IBM Corporation; "The IBM e-Server pSeries 680 Reliability, Availablity, Serviceability"; http://www-03.ibm.com/sysetms/resources/systems_p_hardware_whitepapers_p680_reliability.pdf, Nov. 2000.

IBM Corporation; "IBM General Parallel File System for AIX: Concepts, Planning, and Installation Guide", retrieved on Jun. 10, 2009 from http://www.nersc.gov/vendor_docs/ibm/gpfs/am3inmst133.html.

(Continued)

*Primary Examiner* — Scott Baderman
*Assistant Examiner* — Chae Ko
(74) *Attorney, Agent, or Firm* — Robert H. Frantz; David A. Mims, Jr.

(57) ABSTRACT

Software components "self-scrub" to improve software reliability, serviceability and availability (RAS). Each component designates a routine to perform a component level consistency check on major data structures and to verify the state of component. This is performed as an on-going task during the life of the component. The component registers an entry point with the system to receive notification of scrubbing parameter changes. The entry point is also called with the request to perform component-scrubbing operations. The entry point functions are responsible for executing within limitations on central processing unit (CPU) usage and memory footprint when performing scrubbing operations.

15 Claims, 9 Drawing Sheets

OTHER PUBLICATIONS

Network Dictionary; definition for "Data Scrubbing"; retrieved on Jun. 10, 2009 from http://www.networkdictionary.com/software/d.php.

Georgetown University; Data Warehouse: Glossary, definition for "data scrubbing"; retrieved on Jun. 10, 2009 from http://uis.georgetown.edu/departments/eets/dw/GLOSSARY0816.html#D.

* cited by examiner

SOFTWARE COMPONENT SELF-SCRUBBING

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

The present invention relates generally to detecting errors in software module storage and execution.

2. Background of the Invention

Whereas the determination of a publication, technology, or product as prior art relative to the present invention requires analysis of certain dates and events not disclosed herein, no statements made within this Background of the Invention shall constitute an admission by the Applicants of prior art unless the term "Prior Art" is specifically stated. Otherwise, all statements provided within this Background section are "other information" related to or useful for understanding the invention.

The effects of software errors can lay undetected for considerable lengths of time before they are detected. Many errors may manifest themselves in slight errors in results, which may or may not be readily noticeable by the consumers of the outputs of the erred software modules.

When errors are finally discovered, many times difficult forensic work must be performed to determine when the error first occurred in order to determine the full impact of the error over the undetected period of time.

There is a need, therefore, for a technology which detects these errors earlier, improves the ability to recover, and makes the problems easier to service.

SUMMARY OF THE INVENTION

Software components "self-scrub" to improve software reliability, serviceability and availability (RAS). Each component designates a routine to perform a component level consistency check on major data structures and to verify the state of component. This is performed as an on-going task during the life of the component. The component registers an entry point with the system to receive notification of scrubbing parameter changes. The entry point is also called with the request to perform component-scrubbing operations. The entry point functions are responsible for executing within limitations on central processing unit (CPU) usage and memory footprint when performing scrubbing operations.

BRIEF DESCRIPTION OF THE DRAWINGS

The following detailed description when taken in conjunction with the figures presented herein provide a complete disclosure of the invention.

DETAILED DESCRIPTION OF THE INVENTION

The inventors of the present invention have recognized and solved problems previously unrecognized by others in the art of early detection of errors which may occur in software modules and data structures stored in computer readable memory.

In our use of the term "scrubbing", we are referring to a process of examining the consistency of a software component and its associated data structures, excluding any processes which attempt to correct or fix an error discovered within the software component or its data structures. This term should not be confused with data cleansing.

For example, software component scrubbing examines past sequences of component executions to make sure certain sequences have been properly executed, and that those executed components modified the proper areas of memory. Scrubbing may also verify that all dynamic links and references, such as links to Dynamic Linked Library (DLL) components, are valid (e.g. each component referred to by a link is present, consistent, etc.). This term is prevalently used within the AIX™, UNIX™ and LINUX™ operating system arts, for example.

Software component scrubbing is performed to improve software RAS. A configurable amount of system resources are dedicated to perform error checking on software component integrity and health. This allows for earlier detection of errors. Reliability is improved by detecting latent errors in the system. Serviceability is improved by detecting problems earlier and closer to their source. Availability can be improved since when problems are detected early there is a better chance for recovery.

Figure 1:
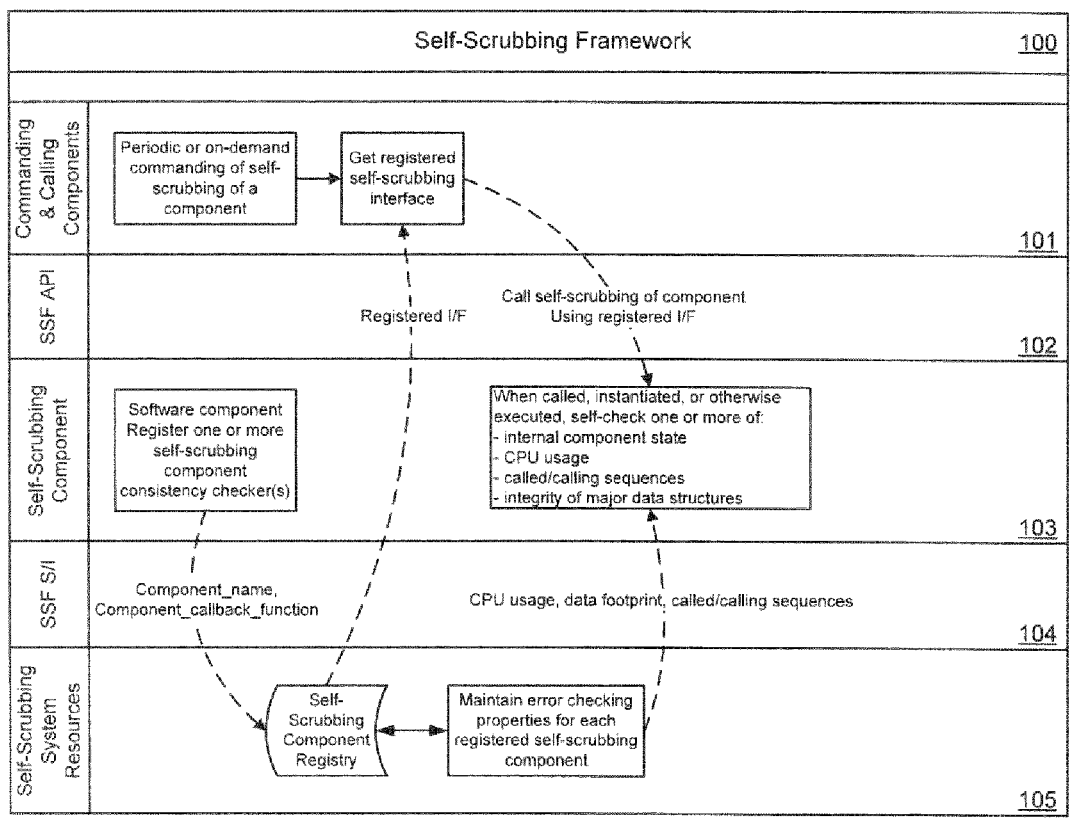
FIG. 1 shows a cross-functional diagram according to a logical process of the invention, including the communications across interfaces between the active entities which also illustrates a process of a protocol between the active entities.

According to our invention, software component "self-scrubbing" is implemented with a system framework (100) as exemplified in FIG. 1, and through program adoption of certain operations. We are using a new term "self-scrubbing" to describe an approach and applications of that approach into technologies in which each software module is tasked with providing its own scrubbing technologies for itself and only itself. In this manner, each compliant software module is provided into a system complete with scrubbing technology required for it, and external or "third party" scrubbing technologies need not be provided or coordinated by the author/publisher of the self-scrubbing software components. In FIG. 1, arrowed lines which are solid denote program flow, and arrowed lines which are dashed or broken denote interface operations or co-operations.

Our system framework provides:

Services to register component consistency checkers. This registration through a self-scrubbing framework system interface (SSF S/I) (104) involves providing the self-scrubbing system (105) with a component name and a component callback function.

The framework (105) maintains error checking properties for each component in a system.

Limits on system resources such as CPU usage can be set at a system level.

Services that report scrubber's CPU usage and data footprint (105).

A self-scrubbing application programming interface (API) (102) through which other programs, circuits, or operator commands (101) may be issued to a software component to initiate self-scrubbing.

A software component (103) that participates in software scrubbing provides:

Registration and callbacks that interact with the component scrubbing framework.

Component specific code that checks internal component state, such as data structure checks for inconsistent state.

Scrubbing at specified intervals and at specified "drill-down" level.

The following logical process, or processes, can be implemented as a combination of software and hardware, such as software being executed by a microprocessor, or alternatively may be implemented in part or whole in customized circuitry or electronic "logic". "Software component" as used in this disclosure refers to an actual software module, or instance of an object, as stored in computer readable memory.

Self-Scrubbing Self-Designation. Each software component designates a routine to perform a component level consistency check on its own major data structures and to verify the state of component itself. In other words, each software component designates a self-scrubbing routine. The routine can be a portion of the software component itself, or it can be a separate logical entity such as a separate software module in computer memory or even a separate electronic circuit. Self-scrubbing is performed as an on-going task during the life of the software component.

Registered Entry Points. The software component also registers entry point, such as scrub_ctrl( ), with the computing system through which the software component receives notification of scrubbing parameter changes. The entry point is also called with a request to perform component scrubbing operations. Entry point functions are responsible for executing within limitations on CPU usage and memory footprint when performing scrubbing operations. They typically are given short execution intervals, and are required to voluntarily give up or terminate when their execution window expires.

Self-Scrubbing Framework. The self-scrubbing system framework maintains a registration of all components that have registered scrubbing operations through registration of an entry point. For each registration, component specific properties are maintained. Examples of component specific properties in our embodiment are:

(a) scrublevel—Detail level at which to perform scrubbing. For example, on low detail level only simple eye-catcher checks are performed on critical data structures. When detail levels are increased, checks on additional data structure fields are performed.

(b) scrubperiod—This defines the desired period for a complete check of a component.

(c) scrubenabled—This defines if scrubbing is enabled for a component.

At a system level, scrubbing properties are also maintained. Examples of system properties in our embodiment are:

(d) scrubcpupct—Percentage of CPU allocation dedicated for scrubbing.

A scrub control command, scrubsctrl, is provided to manage software component scrubbing. It has the following syntax in our embodiment:

(e) scrubctrl command [component-name]

Component Commands. In our embodiment, the following component commands are provided with associated parameters and valid ranges:

(f) scrubdetail=N sets the scrub level to N [0-9] for the specified component.

(g) scrubperiod=N (1-99999 minutes) sets the component specific scrubber to be called every N minutes.

(h) scrubon enables component scrubbing if error checking is enabled.

(i) scruboff disables component scrubbing if error checking is enabled.

(j) Component specific commands are possible. For example, a specific data structure can be targeted.

System Commands. Also in our embodiment, system commands are provided, which do not have a "component-name" associated with them (e.g. they do not apply to or affect a single component, but affect overall self-scrubbing system operation):

(k) scrubcpupct=N (1-100 msec) sets the CPU time in milliseconds made available to the component scrubbers. The default is 1 millisecond for every 1 second of a busy system.

(l) scrubquery—Display system properties and values. Also list registered scrubbing components and their properties.

Example of Operation

The following example of operation of our embodiment is for illustrative purposes only, and should not be construed to set forth the extent or limitations of the present invention. Those ordinarily skilled in the art will readily recognize that this example scenario and operation is just one of many possible uses of the present invention.

The following example applies to an "inode" table, which is a data structure common to Unix™, AIX™, and Linux™ systems. An inode contains important information pertaining to files within a file system. When a file system is created in UNIX, a set amount of nodes is created, as well. Usually, about one percent of the total file system disk space is allocated to the inode table. The inode table contains a listing of all inode numbers for the respective file system. When users search for or access a file, the UNIX system searches through the inode table for the correct inode number. When the inode number is found, the command in question can access the inode and make the appropriate changes if applicable. Much more information on these well-known structures (and methods for use) is available in Unix and AIX texts, such as "Speaking UNIX: It's All About the inode" by Adam T.

Cormany of Scientific Games Corporation, published by International Business Machines (copyright 1994 and 2007).

According to our invention, when a filesystem component requires self-scrubbing on its inode table, the filesystem component registers an entry point "filesystem" component with the computing system, providing the filesystem_scrub( ) callback.

And, the filesystem component provides an inode table scrub function that checks entries in the inode table. The scrubbing function typically checks individual table entries until its execution window has expired. It then terminates until the next scrubbing callback is made.

On return, the scrubber (e.g. the scrub function) periodically provides an indication to the system of its progress with a percent complete value. The system provides default properties for each component. These properties can also be altered on a running system with the scrubctrl command. For example, the following commands request that the filesystem component is scrubbed once every 60 minutes at detail level 3:

scrubctrl scrubdetail=3 filesystem
scrubctrl scrubperiod=60

Example Logical Process

Figure 5:
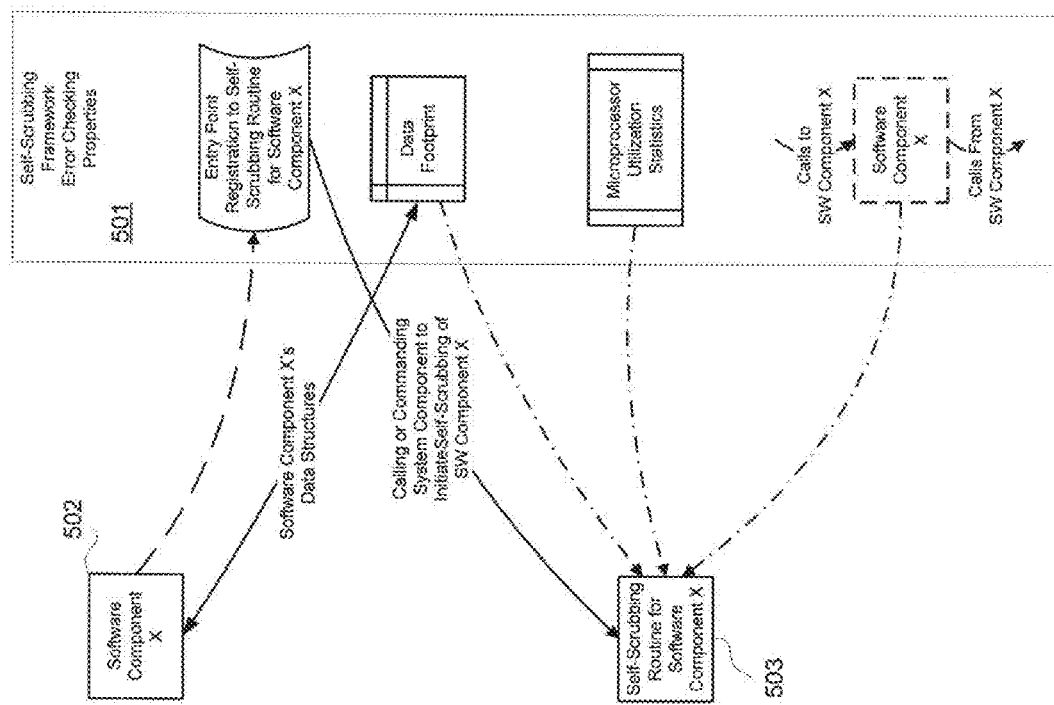
FIG. 5 illustrates a logical process according to the present invention.

Turning to FIG. 5, an example logical process according to the present invention is shown. A self-scrubbing Software Component "X" (502) initially registers (501) and entry point for its own self-scrubbing routine (503) with the framework (501).

During execution of Software Component X (502), the framework maintains a plurality of error checking properties (501) in addition to the entry point, including, for example, monitoring the processor bandwidth consumed by Software Component X, the data footprint utilized by Software Component X, the calls from other components to Software Component X, and the calls that Software Component X makes to other components.

When a calling or commanding system component initiates self-scrubbing, it obtains the registered entry point (501) from the framework and calls the Self-Scrubbing Routine (503) with appropriate control parameters as previously described.

Self-Scrubbing Routine (503) then accesses and analyzes the error checking properties (501) for Software Component X, including, for example, the processor bandwidth consumed by Software Component X, the data footprint utilized by Software Component X, the calls from other components to Software Component X, and the calls that Software Component X makes to other components. Any of these properties which are out of limits are then reported to the calling or commanding system component.

The calling or commanding system component may then use these results from the Self-Scrubbing Routine to prepare and output a report to a user or administrator, and to automatically schedule appropriate corrective action such as re-allocation of system resources, initiation of a repair or upgrade order, and restarting of Software Component X.

Suitable Computing Platform

Whereas at least one embodiment of the present invention incorporates, uses, or operates on, with, or through one or more computing platforms, and whereas many devices, even purpose-specific devices, are actually based upon computing platforms of one type or another, it is useful to describe a suitable computing platform, its characteristics, and its capabilities.

Therefore, it is useful to review a generalized architecture of a computing platform which may span the range of implementation, from a high-end web or enterprise server platform, to a personal computer, to a portable PDA or wireless phone.

In one embodiment of the invention, the functionality including the previously described logical processes are performed in part or wholly by software executed by a computer, such as personal computers, web servers, web browsers, or even an appropriately capable portable computing platform, such as personal digital assistant ("PDA"), web-enabled wireless telephone, or other type of personal information management ("PIM") device. In alternate embodiments, some or all of the functionality of the invention are realized in other logical forms, such as circuitry.

Figure 2A:
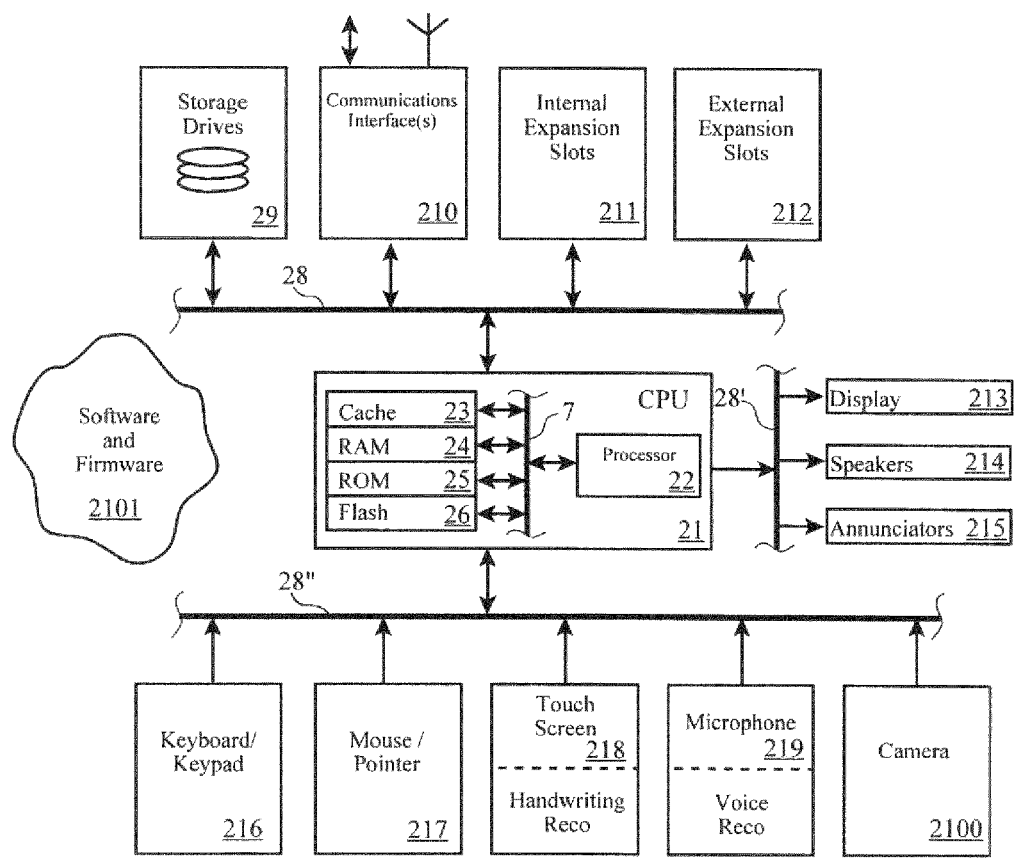
FIGS. 2a and 2b show generalized computing platform architecture, and a generalized organization of software and firmware of such computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc. The computing platform is also provided with one or more software and firmware (2101) programs to implement the desired functionality of the computing platforms.

Figure 2B:
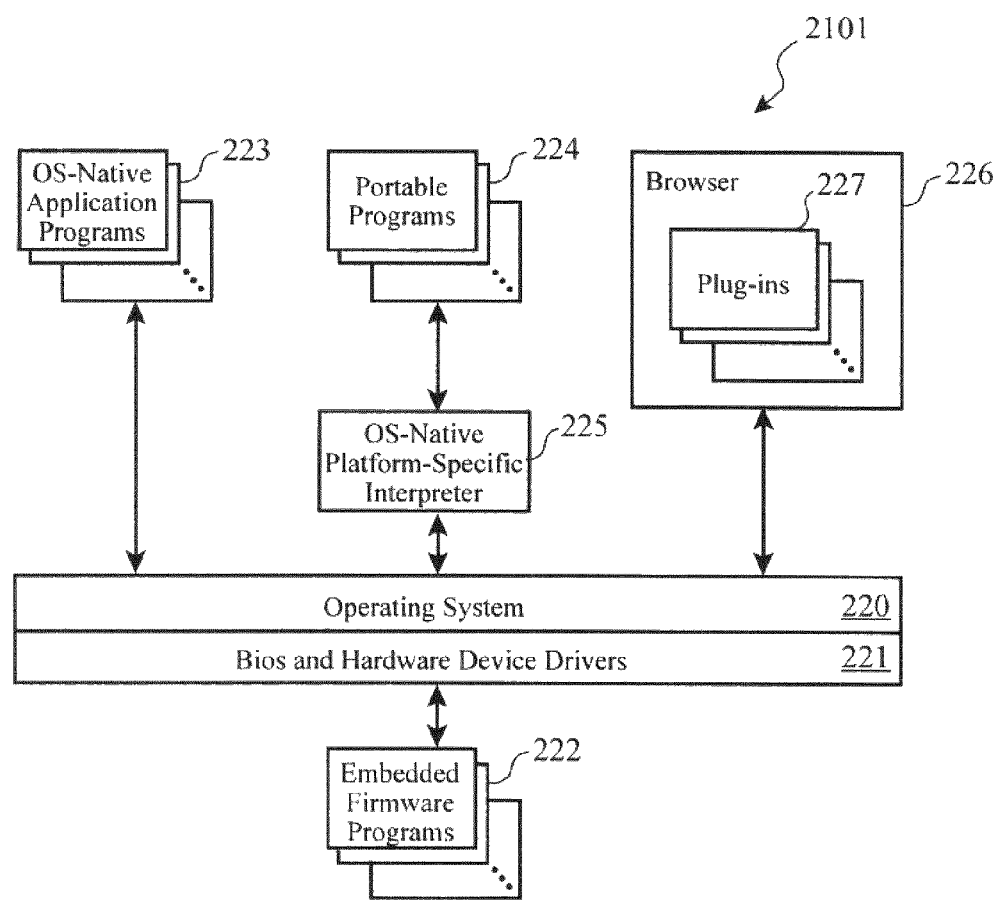
Figure 3A:
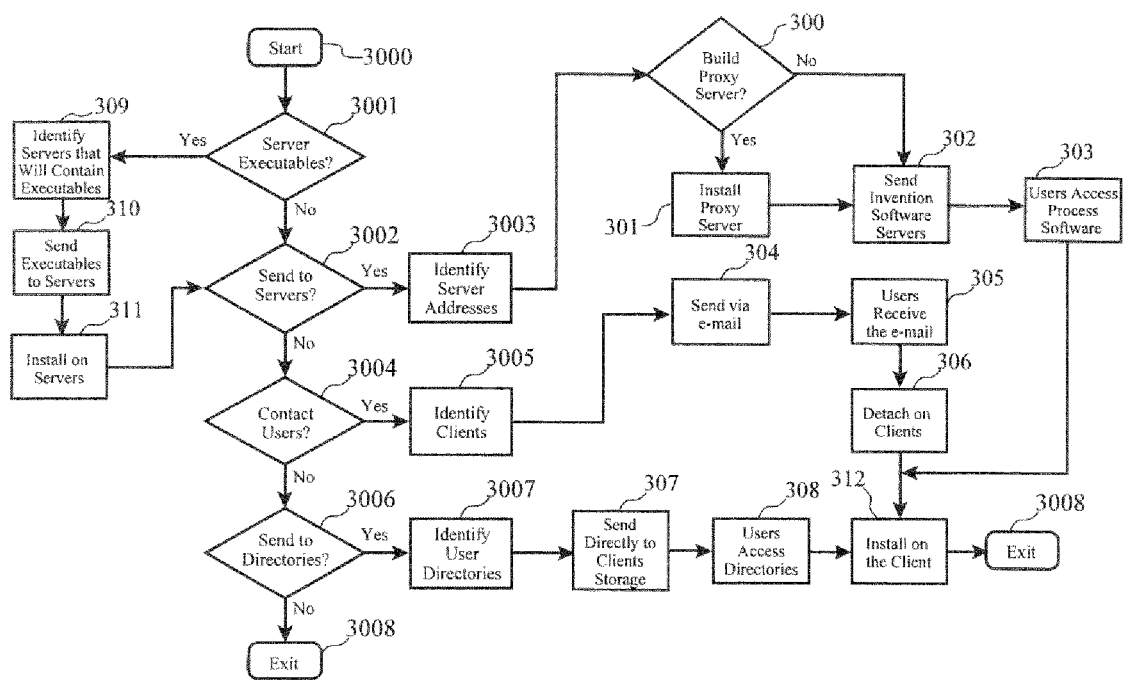
FIG. 3a sets forth a logical process to deploy software to a client in which the deployed software embodies the methods and processes of the present and related inventions.
Figure 3B:
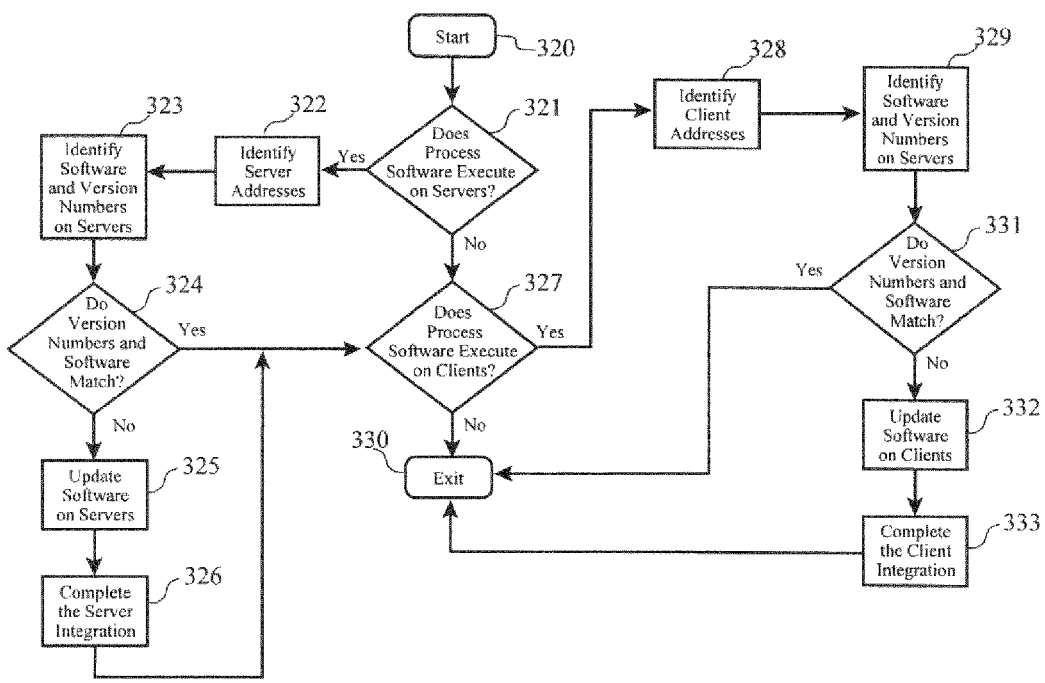
FIG. 3b sets forth a logical process to integrate software to other software programs in which the integrated software embodies the methods and processes of the present and related inventions.
Figure 3C:
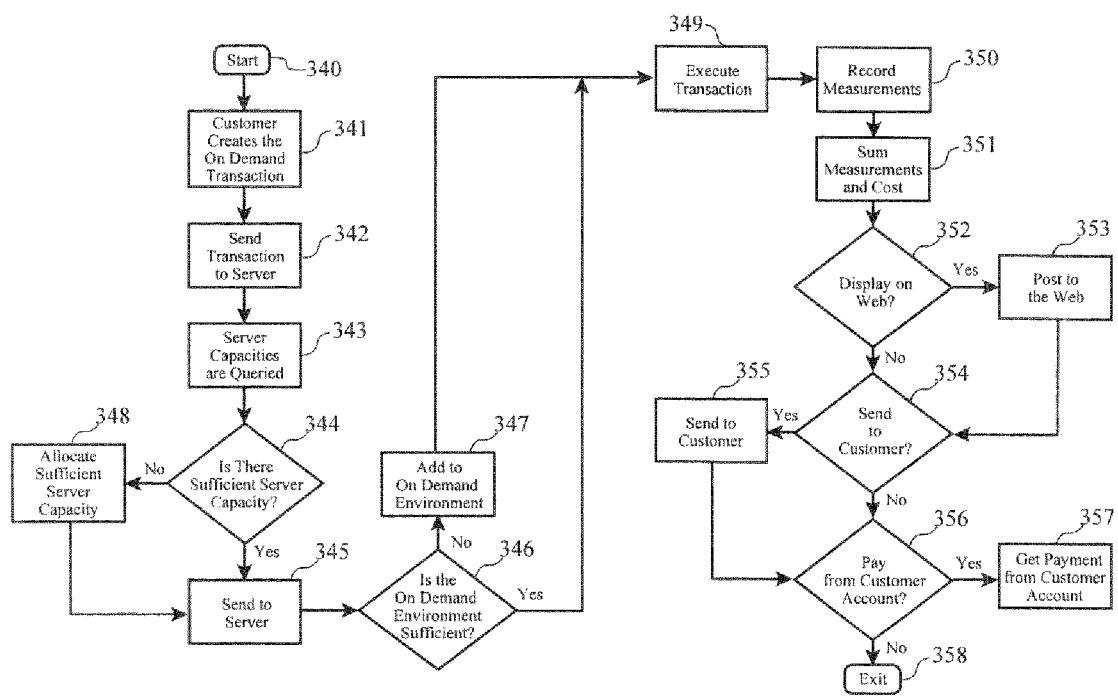
FIG. 3c sets forth a logical process to execute software on behalf of a client in an on-demand computing system, in which the executed software embodies the methods and processes of the present and related inventions.
Figure 3D:
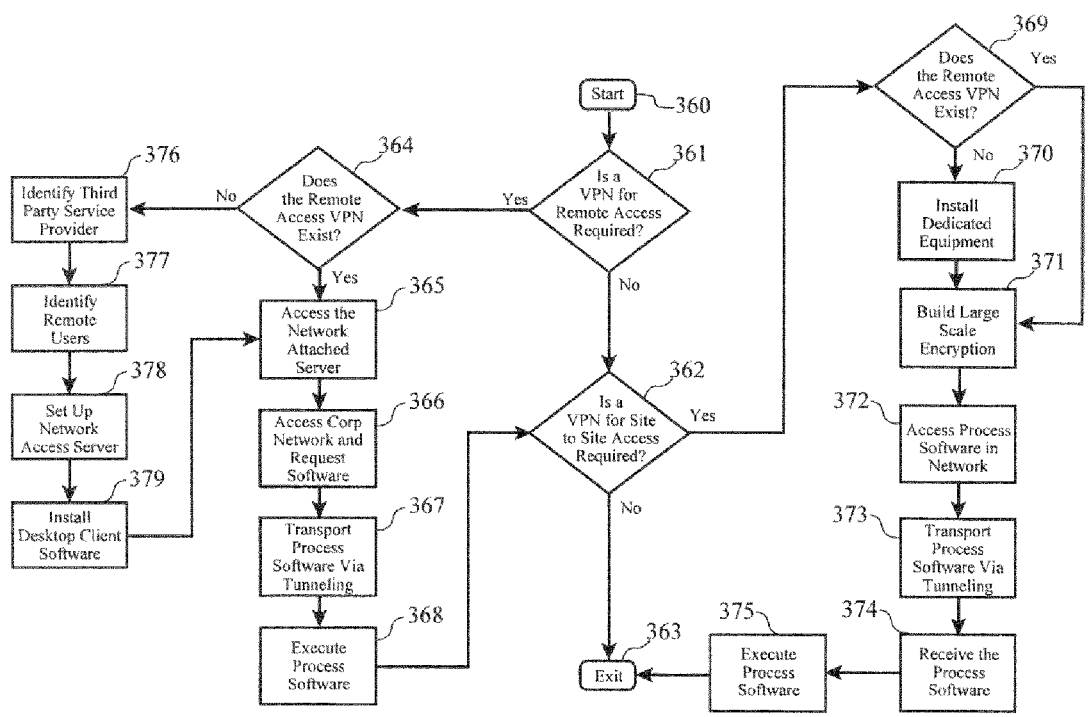
FIG. 3d sets forth a logical process to deploy software to a client via a virtual private network, in which the deployed software embodies the methods and processes of the present and related inventions.

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Computer-Readable Memory Embodiments

In another embodiment of the invention, logical processes according to the invention and described herein are encoded on or in one or more computer-readable memories. Some computer-readable memories are read-only (e.g. they must be initially programmed using a different device than that which is ultimately used to read the data from the memories), some are write-only (e.g. from the data encoders perspective they can only be encoded, but not read simultaneously), or read-write. Still some other memories are write-once, read-many-times.

Some memories are relatively fixed in their mounting mechanisms, while others are removable. All computer-readable memories form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
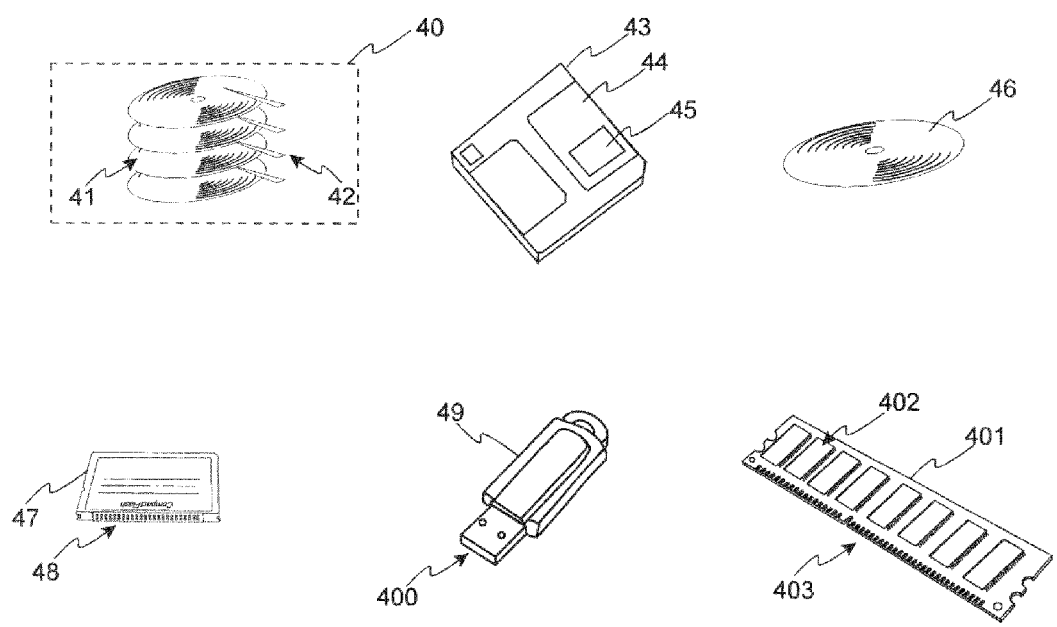
FIG. 4a illustrates computer readable memories of various removable and fixed types.

FIG. 4a illustrates some computer readable memories including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable memories is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable memories.

Another common type of removable memories are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the memories is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based memories, as well as increased reliability and decreased susceptibility to mechanical shock and vibration. Often, they provide less storage capability than comparably priced disk-based memories.

Yet another type of computer readable memories device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable memories types described in the foregoing paragraphs.

Conclusion

While certain examples and details of a preferred embodiment have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. A computer-based method for software component self-scrubbing, the method comprising:
    designating a self-scrubbing routine by a software component in a computing platform, wherein the computing platform includes a processor;
    registering by the computing platform the self-scrubbing routine by the software component by providing an entry point with one or more scrubbing parameters to a self-scrubbing framework portion of the computing platform, wherein the scrubbing parameter comprises a limit of processor bandwidth to be consumed by execution of the self-scrubbing routine;
    subsequent to and responsive to the registering, maintaining by the computing platform one or more error checking properties associated with the software component by the self-scrubbing framework portion;
    obtaining by the computing platform the entry point from the self-scrubbing framework portion by a commanding or calling portion of the computing platform;
    initiating by the computing platform self-scrubbing of the software component by the commanding or calling portion of the computing platform using the entry point and by providing one or more scrubbing parameters; and
    responsive to the initiating, performing by the computing platform the self-scrubbing routine within the designated limit of processor bandwidth according to the provided scrubbing parameters by accessing the maintained error checking properties, performing one or more integrity checks on the software component, and reporting one or more results to the commanding or calling portion of the computing platform.

2. The method as set forth in claim 1 wherein the maintaining of error checking properties comprises monitoring a data footprint consumed by execution of the software component.

3. The method as set forth in claim 1 wherein the maintaining of error checking properties comprises recording a sequence of program calls to the software component from software components other than the software components.

4. The method as set forth in claim 1 wherein the maintaining of error checking properties comprises recording a sequence of program calls performed from the software component to software components other than the software components.

5. The method as set forth in claim 1 wherein the performing an integrity check on the software component comprises verifying that all dynamic links and references associated with the software component are valid.

6. A computer program product for software component self-scrubbing comprising:
    a tangible, computer readable memory device;
    first program instructions to designate a self-scrubbing routine by a software component in a computing platform;
    second program instructions to register the self-scrubbing routine by the software component by providing an entry point with one or more scrubbing parameters to a self-scrubbing framework portion of the computing platform, wherein the scrubbing parameter comprises a limit of processor bandwidth to be consumed by execution of the self-scrubbing routine;
    third program instructions to, subsequent to and responsive to the registering, maintain one or more error checking properties associated with the software component by the self-scrubbing framework portion,
    fourth program instructions to obtain the entry point from the self-scrubbing framework portion by a commanding or calling portion of the computing platform;
    fifth program instructions to initiate self-scrubbing of the software component by the commanding or calling portion of the computing platform using the entry point and by providing one or more scrubbing parameters; and
    sixth program instructions to, responsive to the initiating, perform the self-scrubbing routine within the designated limit of processor bandwidth according to the provided scrubbing parameters by accessing the maintained error checking properties, performing one or more integrity checks on the software component, and reporting one or more results to the commanding or calling portion of the computing platform;
    wherein the program instructions are stored on the tangible, computer readable memory device.

7. The computer program product as set forth in claim 6 wherein the program instructions to maintain error checking properties comprises program instructions to monitor a data footprint consumed by execution of the software component.

8. The computer program product as set forth in claim 6 wherein the program instructions to maintain error checking properties comprises program instructions to record a sequence of program calls to the software component from software components other than the software components.

9. The computer program product as set forth in claim 6 wherein the program instructions to maintain error checking properties comprises program instructions to record a sequence of program calls performed from the software component to software components other than the software components.

10. The computer program product as set forth in claim 6 wherein the program instructions to perform an integrity check on the software component comprises program instructions to verify that all dynamic links and references associated with the software component are valid.

11. A system for software component self-scrubbing, the system comprising:
- a computing platform having a processor, and having one or more tangible computer-readable storage memories suitable for storing one or more software components;
- a designation in the tangible computer-readable storage memory by a software component of a self-scrubbing routine;
- a self-scrubbing framework portion of the computing platform;
- a registration in the tangible computer-readable storage memory of the self-scrubbing routine by the software component providing an entry point with one or more scrubbing parameters to the self-scrubbing framework portion of the computing platform, wherien the scrubbing parameter includes a limit of processor bandwidth to be consumed by execution of the self-scrubbing routine;
- one or more error checking properties in the tangible computer-readable storage memory maintained subsequent to and responsive to the registration, having one or more error checking properties associated with the software component by the self-scrubbing framework portion;
- an entry point obtained from the self-scrubbing framework portion by a commanding or calling portion of the computing platform;
- a commanding or calling portion of the computing platform for obtaining and using the entry point, for accessing the one or more scrubbing parameters, and for initiating a self-scrubbing routine according to the entry point and scrubbing parameters; and
- a self-scrubbing routine portion of the computing platform designated by the designation, entered by the entry point, and responsive to the initiating, performing self-scrubbing according to the scrubbing parameters within the limit of processor bandwidth by accessing the maintained error checking properties, performing one or more integrity checks on the software component, and reporting one or more results to the commanding or calling portion of the computing platform.

12. The system as set forth in claim 11 wherein the wherein the error checking properties comprise a monitored data footprint consumed by execution of the software component.

13. The system as set forth in claim 11 wherein the wherein the error checking properties comprise a recording of a sequence of program calls to the software component from software components other than the software components.

14. The system as set forth in claim 11 wherein the wherein error checking properties comprise a recording of a sequence of program calls performed from the software component to software components other than the software components.

15. The system as set forth in claim 11 wherein the wherein the performing of an integrity check on the software component comprises verifying that all dynamic links and references associated with the software component are valid.

\* \* \* \* \*